United States Patent
Gao (10) Patent No.: US 9,355,010 B2
(45) Date of Patent: May 31, 2016

(54) DERIVING AN OPERATIONAL STATE OF A DATA CENTER USING A PREDICTIVE COMPUTER ANALYSIS MODEL

(71) Applicant: Seagate Technology LLC, Cupertino, CA (US)

(72) Inventor: Kaizhong Gao, North Oaks, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 261 days.

(21) Appl. No.: 14/065,667

(22) Filed: Oct. 29, 2013

(65) Prior Publication Data

US 2015/0120636 A1 Apr. 30, 2015

(51) Int. Cl.
*G06F 11/30* (2006.01)
*G06N 5/02* (2006.01)
*G06F 11/34* (2006.01)

(52) U.S. Cl.
CPC ........ *G06F 11/3447* (2013.01); *G06F 11/3006* (2013.01); *G06F 11/3409* (2013.01); *G06N 5/02* (2013.01); *Y02B 60/165* (2013.01)

(58) Field of Classification Search
CPC . G06F 11/30; G06F 11/3006; G06F 11/3447; G06F 11/3409; G06N 5/02; Y02B 60/165
USPC ............................................. 706/47; 702/182
See application file for complete search history.

(56) References Cited

U.S. PATENT DOCUMENTS

| | | | |
|---|---|---|---|
| 6,691,067 B1 * | 2/2004 | Ding et al. ................... | 702/186 |
| 8,055,926 B2 | 11/2011 | Piper et al. | |
| 8,285,302 B1 | 10/2012 | Espy et al. | |
| 8,311,967 B1 * | 11/2012 | Lin et al. ......................... | 706/45 |
| 8,386,930 B2 | 2/2013 | Dillenberger et al. | |
| 2006/0225446 A1 * | 10/2006 | Bash et al. ....................... | 62/178 |
| 2007/0213956 A1 * | 9/2007 | Nasle et al. ................... | 702/182 |
| 2008/0269932 A1 | 10/2008 | Chardon et al. | |
| 2009/0326884 A1 * | 12/2009 | Amemiya et al. ................. | 703/6 |
| 2010/0049494 A1 * | 2/2010 | Radibratovic et al. ........... | 703/13 |
| 2010/0280796 A1 * | 11/2010 | Ramin et al. ................... | 702/188 |
| 2010/0313145 A1 * | 12/2010 | Dillenberger et al. ........ | 715/757 |
| 2011/0016342 A1 * | 1/2011 | Rowan et al. ................. | 713/340 |
| 2011/0301911 A1 * | 12/2011 | VanGilder et al. ............ | 702/136 |
| 2012/0109404 A1 * | 5/2012 | Pandey et al. ................. | 700/299 |
| 2012/0158387 A1 * | 6/2012 | VanGilder et al. ................ | 703/9 |
| 2012/0271935 A1 * | 10/2012 | Moon ........................... | 709/224 |
| 2013/0073245 A1 * | 3/2013 | Bhagwat et al. .............. | 702/130 |

(Continued)

FOREIGN PATENT DOCUMENTS

WO WO2010126469 11/2010

OTHER PUBLICATIONS

Chandra A. et al., "Dynamic Resource Allocation for Shared Data Centers Using Online Measurements", IWQoS 2003, LNCS 2707, pp. 381-398, 2003.*
Economou D. et al., "Full-System Power Analysis and Modeling for Server Environments", International Symposium on Computer Architecture—IEEE, 2006.*
Kundu S. et al., "Application Performance Modeling in a Virtualized Environment", IEEE, 2009.*

*Primary Examiner* — Stanley K Hill
*Assistant Examiner* — Dave Misir
(74) *Attorney, Agent, or Firm* — Hollingsworth Davis, LLC (57) ABSTRACT

Performance of a data center is predicted using a computer analysis model. Operational measurements of components of computing nodes of the data center are received as input to the computer analysis model. An operational state of the data center is derived via the computer analysis model responsive to the operational measurements.

18 Claims, 7 Drawing Sheets

(56) References Cited

U.S. PATENT DOCUMENTS

| | | |
|---|---|---|
| 2013/0080375 A1* | 3/2013 | Viswanathan et al. .......... 706/52 |
| 2014/0189086 A1* | 7/2014 | Chattopadhyay et al. .... 709/223 |
| 2014/0222745 A1* | 8/2014 | Deng et al. ...................... 706/47 |
| 2014/0337474 A1* | 11/2014 | Khuti et al. ................... 709/217 |
| 2014/0358471 A1* | 12/2014 | VanGilder et al. ............ 702/130 |

* cited by examiner

DERIVING AN OPERATIONAL STATE OF A DATA CENTER USING A PREDICTIVE COMPUTER ANALYSIS MODEL

BACKGROUND

The present disclosure is generally related to data center equipment. An increasing number of data centers being built to satisfy the demands of popular Internet services such as social media, cloud computing and the like. Large data centers may cover hundreds of thousands of square feet, and may house an equivalent number of individual computing nodes. Management of such a complex operation may require equally complex monitoring equipment. The monitoring equipment ensures the data center as a whole is performing as desired, and facilitates troubleshooting and correcting problems. Such monitoring solutions can be expensive, and may not always follow the improvements in cost-to-performance ratio that is seen in the computing equipment itself.

SUMMARY

The present disclosure is related to deriving an operational state of a data center using a predictive computer analysis model. A computer analysis model is formed that predicts performance of the data center before the data center is operational. The computer analysis model is integrated with a management service of the data center. Operational measurements of computing nodes are received at the management service, and an operational state of the data center is derived via the computer analysis model responsive to the operational measurements.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same/analogous components in multiple figures.

DETAILED DESCRIPTION

The present disclosure is related to systems, methods, and apparatuses used to monitor status of large-scale data centers. The term "status" generally refers to measured variables that are indicative of operational health and/or efficiency of the components of the data center. The components monitored include, but are not limited to, processors, circuit boards, volatile memory, persistent data storage devices, power supplies, communications interfaces, peripherals, and cooling equipment. The systems, methods and apparatuses may also be used to control aspects of the data center operation, such controlling cooling equipment, reassigning workloads to increase performance and/or distribute wear, minimizing power consumption, increasing response speed and throughput, increasing reliability, etc. An example of data center components is shown in the isometric view of FIG. 1.

Figure 1:
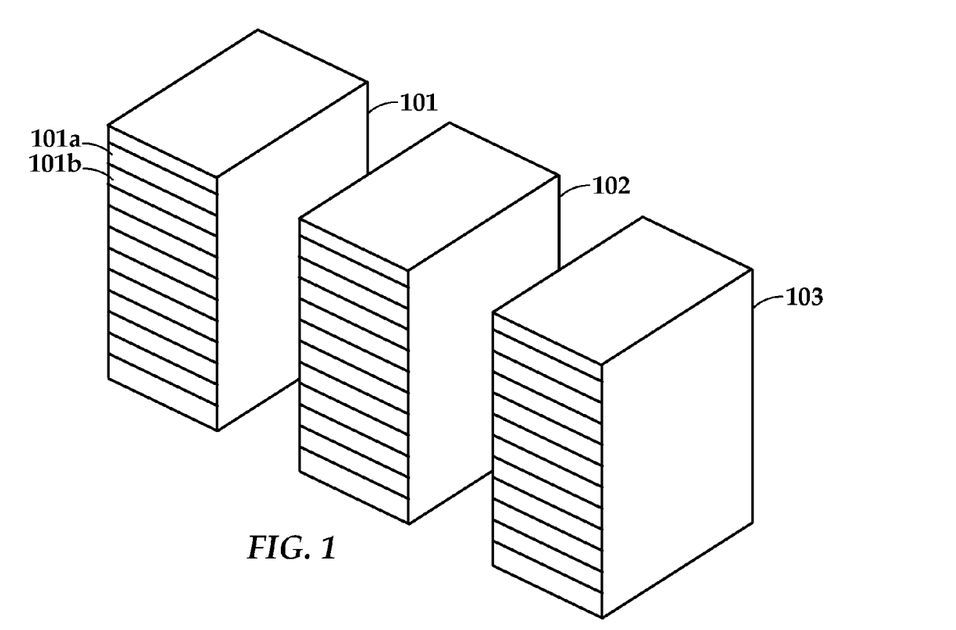
FIG. 1 is an isometric view of data center racks according to an example embodiment.

In FIG. 1, racks 101-103 represent collections of data center components that are housed in a single enclosure. The racks 101-103 at least provide a common structure for conveniently mounting individual components, and may provide other common functions, such as distribution of cooling air/fluid, power supplies, power backup, data and power busses, cable management, etc. Each of the racks 101-103 may have a plurality of rack mountable devices, such as rack mount devices 101a and 101b in rack 101. The rack mount devices may include any combination of computers, storage arrays, power supplies, etc., and the concepts described herein are relevant to any arrangement of racks and rack mount devices included therein.

A data center may have hundreds or thousands of racks 101-103, each including a plurality of components. An operator of the media center will generally desire to monitor the operation using as few people as possible. The monitoring may include at least determining whether and where any failures have occurred so that remedial action, if any, needs to be taken. In some configurations, the data center may be tolerant of a small number of device failures, and action might not be taken unless the number of failures reaches a threshold, or is indicative of a larger systemic failure.

An example of a fault tolerant data center includes clustered system, where computing tasks are divided spread across different network computing nodes. The clustered system can automatically adjust to the failure of a computing node, e.g., by reassigning other computing nodes to handle tasks assigned to the failed node. In such a configuration, the failure of a few nodes may not require any immediate action. In some cases, it may be more cost effective to simply shut off the failed computing node rather than replace it, assuming the data center has sufficient extra computing capacity so that loss of the node has minimal impact.

Nonetheless, even in clustered or distributed systems, some level of monitoring may be required to ensure the system is operating effectively. For example, it may be desired to evenly divide tasks between all available computing nodes. This may ensure optimum performance in some situations, and also helps in leveling out wear between the computing nodes. High utilization can result in build-up of heat in processors and components, increase usage of mechanical devices such as hard disk drives, and otherwise consume life of the computing devices. By evenly distributing tasks among the components, wear of the components is evened out, ensuring a predictable number of the components will remain operational over the expected lifetime of the computing system. This can increase the net reliability of the data center.

Figure 2:
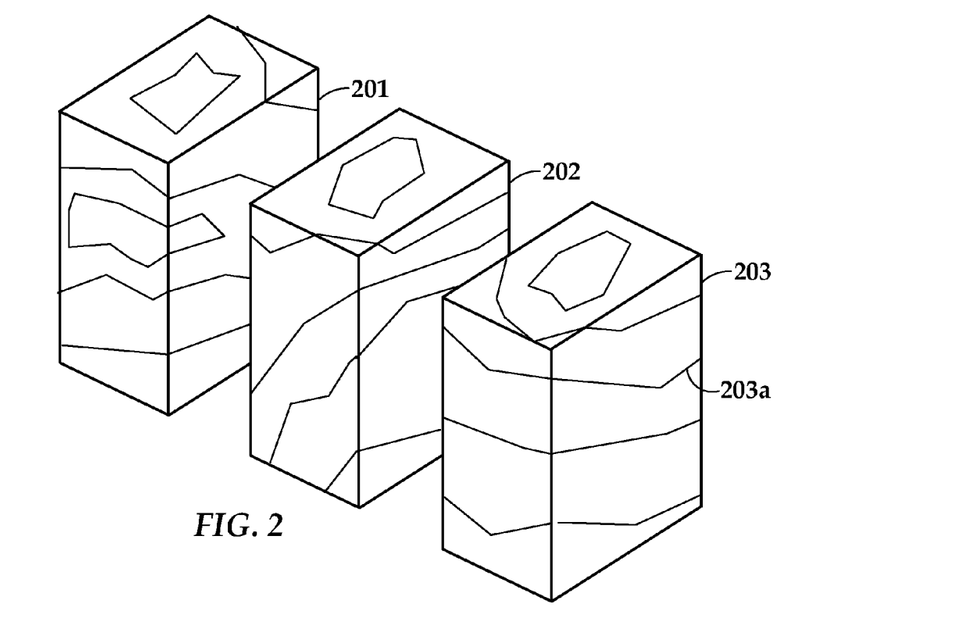
FIG. 2 is a three-dimensional contour display of data center racks according to an example embodiment.

The monitored data may be presented to an operator in a number of ways. For example, a console device may display status in the form of text, tables, graphical user interface (GUI) components, etc. Another form of status display is shown in FIG. 2, which illustrates a three-dimensional contour map according to an example embodiment. The contour map includes blocks 201-203 that represent a status value of the racks 101-103 in FIG. 1. The status value is shown in the form of isolines, e.g., line 203*a*. The isolines represent a physical region where particular state values (e.g., temperature, power consumption, airflow volume) are constant, and the state value varies between the isolines. A more detailed representation can be achieved by using gradually varying colors with or instead of the isolines.

The display shown in FIG. 2 is also widely used for displaying engineering analysis results of data center components. Generally, a large scale data center may undergo a thorough preliminary analysis to ensure adequacy of cooling and power, estimate building and operating costs, ensure physical and electrical compatibility, etc. Some of these analyses, such as thermal analysis, may create a model of the components (e.g., finite element model, finite difference model, computational fluid dynamics model, etc.) and solutions to the model may be output in the form of a temperature contour map as shown in FIG. 2.

As will be described in detail below, the models used in the engineering analysis can be adapted for use in a monitoring system. This takes advantage of the considerable effort involved in defining geometry, materials, inputs, boundary conditions, etc. used in the model, as well as subsequent testing and validation of the analytical model. Such a model can be adapted to take a full or partial set of real-time inputs to estimate a number of status conditions. These status conditions can be used for, among other things, optimizing runtime parameters and detecting and/or predicting failures. The measurements of the real-world system can also be used to validate the model and/or improve the accuracy of the model. This feedback can improve the performance of the system being modeled, as well as providing valuable information to the design engineers that can help improve the accuracy of future predictive models.

Figure 3:
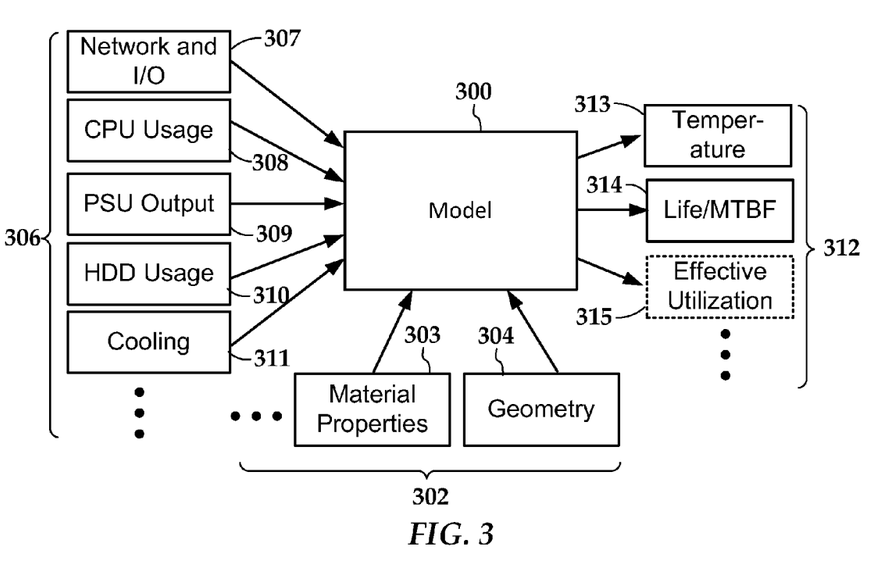
FIG. 3 is a block diagram illustrating a computer analysis model according to an example embodiment.

In reference now to FIG. 3, a block diagram illustrates a model 300 that may be used in a data center modeling arrangement according to an example embodiment. The model 300 may be built and run on an analysis computer, e.g., a computer having a processor coupled to memory that includes computer-aided design and analysis software. The model 300 may include relatively fixed inputs 302, such as material properties 303 and geometry 304. While these inputs 302 may change during the life of the data center, they would be expected to do so infrequently, e.g., on the order of months or years between changes. In contrast, relatively variable inputs 306 are expected to change nearly continuously, and would be monitored at an appropriate time scale.

Variable inputs 306 may include network and other input/output (I/O) activity 307, central processor unit (CPU) usage 308, power supply unit (PSU) usage 309, hard disk drive (HDD) usage 310, and cooling 311 (e.g., air temperature, airflow rate). Based on the inputs 302, 306, the model 300 can calculate status variables 312, such as temperature 313, remaining life and/or revision of mean-time-between-failure (MTBF) 314, and effective utilization of resources 315. The model 300 may produce the outputs using analysis techniques known in the art, such as finite element method (FEM), finite difference method (FDM), and computational fluid dynamics (CFD).

Generally, analysis techniques such as FEM, FDM, and CFD involve dividing physical objects into elements (e.g., via a mesh of simple shapes such as triangles, squares, cubes). An equation is associated with each element that models a physical response of the element, e.g., heat transfer, stress/strain, fluid flow, etc. The equations for all elements are solved together with system boundary conditions to determine a physical response of the whole model. Other types of analysis tools may also be used instead of or in addition to mesh type modelers. For example, circuit simulators take circuit component definitions as inputs and create systems of equations that solve for conditions of the circuit (e.g., current, voltage). These same programs can be used to model other physical phenomena. For example, conductive heat transfer can be modeled as electrical resistive circuits, with temperature resistance replacing voltage, heat flow replacing current, and thermal conductivity replacing electrical resistance.

For purposes of this discussion, the term "analysis model" is used to define one or more numerical/computational models that predict the response of a physical system, generally one that has not yet been built. The analysis model may include both data and executable instructions operable on a processor. For a large system such as a data center, a number of analysis models at different level of granularities may be used. An example of a hierarchy 400 of analysis models is shown in the block diagram of FIG. 4. This example hierarchy includes a smallest level of models such as component analysis model 402. Generally, the component analysis model 402 represents a smallest level of detail this example, although it will be appreciated that this may be extended to even smaller levels of granularity.

Figure 4:
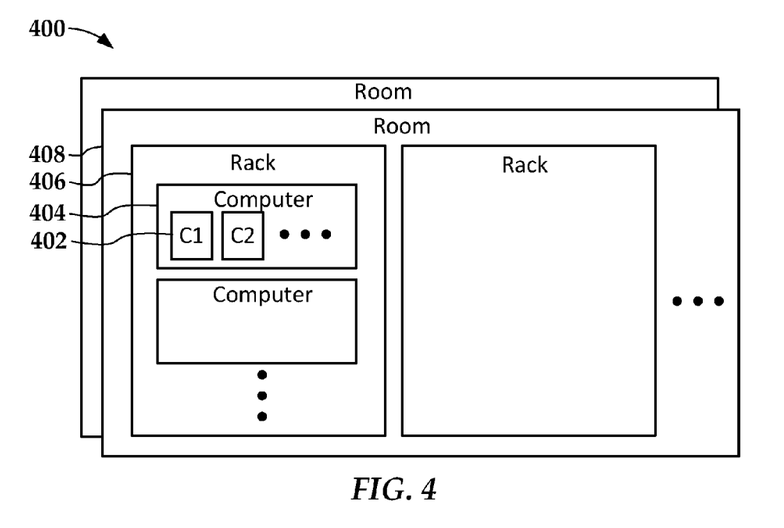
FIG. 4 is a block diagram illustrating a hierarchy of analysis models according to an example embodiment.

The component analysis model 402 represents a computer component (or combination thereof) such as motherboard, processor, hard drive, chipset, peripheral card, etc. Generally, the hierarchy will use a large number of substantially identical components that can be represented by the component analysis model 402. For example, if thousands of a particular of hard drive model are used in the data center, a single analysis model of the hard drive model can be constructed that predicts a performance parameter as a function of input (e.g., temperature as a function of hard drive activity). The single model can be duplicated as needed within higher level models.

The component analysis model 402 can be used to populate higher level models, such as a computer analysis model 404. Generally, the computer analysis model 404 represents a line replaceable unit (LRU) such as a rack server, blade server, storage array, hot-plug hard drive or power supply, etc. The computer analysis model 404 may include a collection of components, some or all of which may be represented by component analysis models 402. The computer analysis model 404 may include other modeled portions, such as mounting structures, heat sinks, fans, etc. The data center may include large numbers of identically or similarly configured LRUs, each type of LRU represented by a corresponding computer analysis model 404.

A rack analysis model 406 includes a collection of LRUs and other modeled portions (e.g., structures, cooling features). The data center may include a number of identical or similarly configured racks represented by a single rack analysis model 406. The racks represented by models 406 may be considered part of a fixed infrastructure or LRUs. Some racks may be relatively mobile (e.g., with wheels and quick-disconnect couplings) such that they can be moved and/or replaced with relative ease.

The mobility or replaceability (or lack thereof) of racks or other components does not necessarily affect the hierarchy or the underlying analysis models, but may impact assumptions of how fixed or changeable various portions are. In some arrangements, the models may be created or managed so that it is easy to make changes to those portions of the model over the life of the data center. Generally, the granular components (e.g., represented by component and computer analysis models 402, 404) may be more subject to replacement, modification, removal, change of location, etc., compared to those at the higher levels of the hierarchy 400.

At the top of the illustrated hierarchy are room analysis models 408, which may at least include a collection of racks represented by rack analysis models 406. The room analysis models 408 may also include geometry that describes spacing and location of racks, as well as large-scale cooling and power supply facilities. A hierarchy may include higher level than the room analysis models 408, such as building analysis models (not shown).

Generally, the example hierarchy 400 is intended to show general interrelationships between analysis models and how such analysis models can be used to generally represent large numbers of similar or identical objects, each possible of experiencing different operating conditions at a given time and being combined in different ways. As noted above, analysis models may be developed during planning stages of a data center, and can be re-used or re-purposed to facilitate monitoring of the data center. An example of how these types of models may be re-used according to an example embodiment is shown in the block diagram of FIG. 5.

Figure 5:
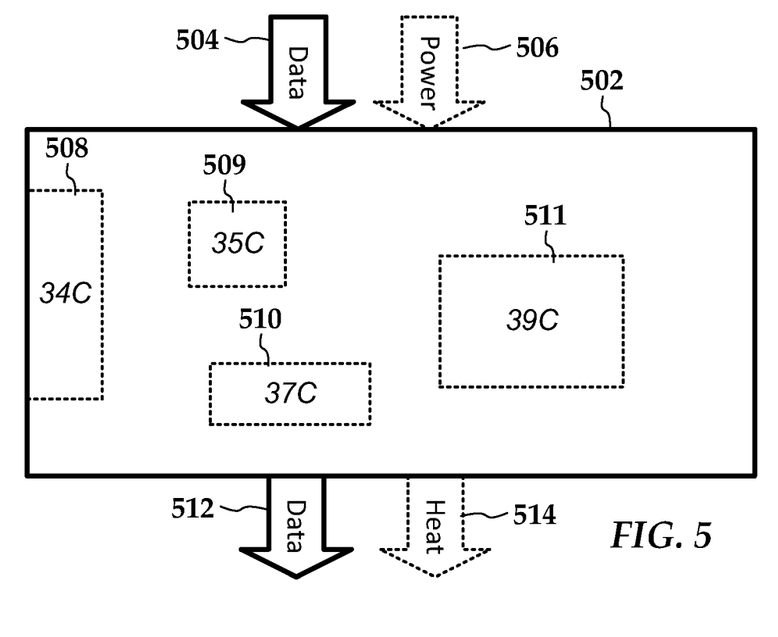
FIGS. 5 and 6 are block diagrams illustrating an example of how an analytical model according to an embodiment may be adapted for monitoring and control.

Block 502 represents an apparatus such as a motherboard or rack server. A system modeler may make some assumptions as to inputs, shown here as data 504 and power 506. Data 504 generally represents a workload that causes a change in operational state of the apparatus 502. For example, if the apparatus 502 was primarily configured as a web server, the data 504 may represent a rate of Hypertext Transfer Protocol (HTTP) service requests. The power 506 may be at least partially dependent on the input, e.g., higher HTTP request rate will generally lead to higher power consumption. The power 506 may be mapped to individual components 508-511. For example, each component 508-511 may draw a predetermined portion of the total power 506 based on a certain performance level/profile.

In response to the inputs of data 504 and power 506, outputs of data 512 and heat 514 may be assumed or determined through analysis. For the purposes of FIGS. 5 and 6, input parameters (e.g., those assumptions that drive the analysis) are shown in bold lines, and the outputs of the analysis are shown in dashed lines. So for this example, the analysis outputs temperatures of components 508-511, net power 506 consumed, and net heat 514 output. Various aspects of the apparatus 502 itself (e.g., heat transfer coefficients, boundary conditions) are set/assumed, as well as particular use cases of data input and output 504, 512 that ultimately drive power consumption by the components 508-511.

The analysis shown in FIG. 5 can be repeated at differing levels of granularity. For example, the behavior of components 508-511 may be derived through individual models of those components 508-511. The behavior of apparatus 502 can be used as input to a higher-level model, e.g., a rack analysis model. The outputs of the analysis can be determined for a wide range of operating conditions, and be used to estimate various operational characteristics, such as how much power is consumed and how much heat is generated.

While the apparatus 502 is in operation, actual data inputs 504 and outputs 512 may not be so simple to measure or compare to the modeled data inputs/outputs. For example, a computer may be called on to perform mixture of tasks, such as web server, database, computational engine, etc. Performance of components 508-511 under such a complex environment (e.g., amount of power drawn) may be less easily predicted. In contrast, parameters such as the temperatures may be fairly easy to measure, and may facilitate estimating workload of individual components 508-511.

Many computer components, such as hard drives and processors, have built in sensors to measure temperature and other conditions. As such, certain aspects of the components operation may be derived based on the model of the apparatus 502 using these measurements as inputs, e.g., back-solving the analysis model. An example of how an analysis model representing the apparatus 502 shown in FIG. 5 can be adapted for a monitoring function is shown in FIG. 6.

Figure 6:
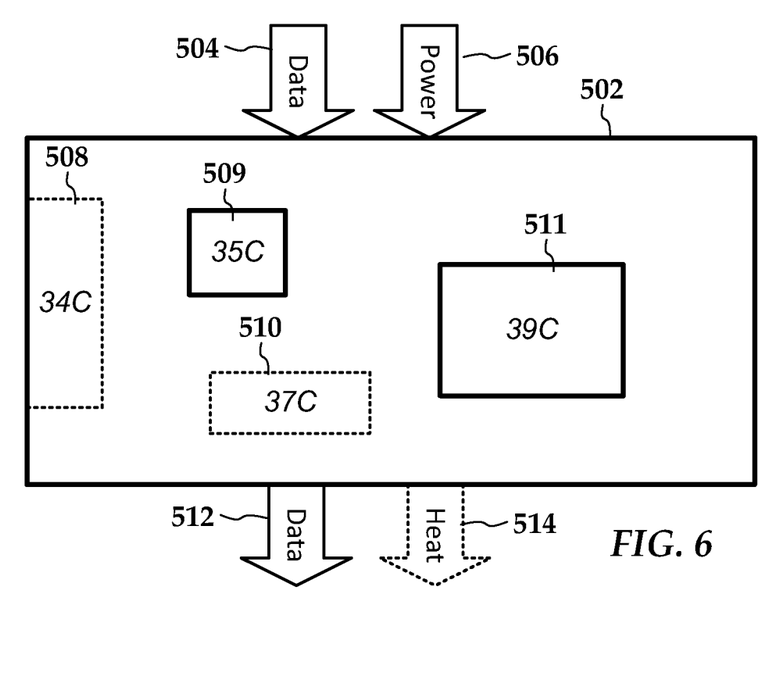

As indicated by different outlining of components in FIG. 6, the temperatures of components 509 and 511 are measured and used as input to the analysis model, which may be the same model used in the analysis of FIG. 5. For temperatures, this may involve setting nodes of the model to a constant temperature boundary condition that corresponds to the measured temperature. Using the analysis model, the temperature of components 508 and 510 is derived based on these, as is an estimate of heat 514 output. The data inputs and outputs 504, 512 and power input 506 may be measured or derived from the input temperatures.

If at least some of the data inputs and outputs 504, 512 and power input 506 are measurable, scenarios may be run using these data/power measurements as input to analysis model to derive the temperatures of components 509 and 511. While this analysis may redundant, e.g., temperatures of components 509 and 511 are already known through measurement, this can be used to detect anomalies by comparing the derived temperatures with the measured temperatures. Significant differences between the derived and measured temperatures may indicate anomalies, and in such a case the apparatus 102 may be subject to additional testing or monitoring. Anomalies may be due to components that are operating out of specification. Anomalies may also be caused by a component that is not being directly measured, but whose abnormal operation may affect the measurements of components 509 and 511. Anomalies can also be caused by incorrect assumptions or other inaccuracies in the analysis model, and as such can be used to update/optimize the analysis model (see, e.g., FIG. 8 and discussion thereof below).

A comparison between the analyzed performance of the apparatus 502 as shown in FIG. 5 and the in-use performance of the apparatus 502 as shown in FIG. 6 may be performed before putting the data center into service to validate (and if needed, modify) the analysis. It may be assumed that the analyzed and actual performance would agree at least initially when the data center is put into service. Anomalies occurring later in service may indicate a change in performance (e.g., reduction in cooling air flow) that was not anticipated in the original analysis or due to a component failure. In the latter case, components can be flagged for maintenance, reduction of workload, backups, or other remedial actions. The anomalies may also be indicative of time-dependent parameters (e.g., reduction in airflow due to dust build-up, changes in heat transfer coefficients due to aging of parts) that can be used to for long term adjustments to the model.

Figure 7:
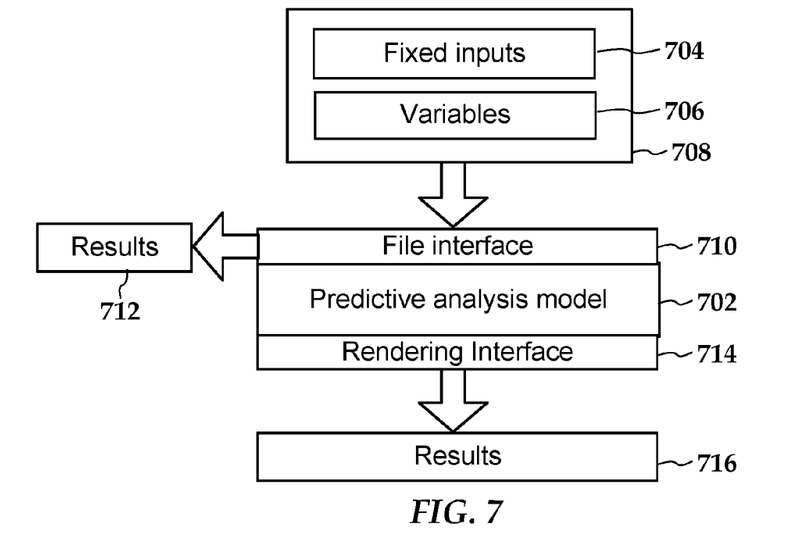
FIGS. 7 and 8 are block diagrams illustrating additional details of how an analytical model according to an embodiment may be adapted for monitoring and control.

As noted above, an analysis model used for predicting data center performance can be subsequently adapted for monitoring data center operation, e.g., utilizing operational measurements as inputs. An example of additional adaptations of an analytical model according to an embodiment is shown in the block diagrams of FIGS. 7 and 8. In FIG. 7, a predictive analysis model 702 receives fixed inputs 704 (e.g., geometry, boundary conditions, material properties) and variable inputs 706 (e.g., dynamic operating conditions) as part of an input file 708. The predictive analysis model 702 itself may include the input data 704, 706 as well as algorithms, instructions, etc., that facilitate. For example, the input data 704, 706 may be used to form data structures (e.g., sparse arrays) that are solved according to a general-purpose algorithm (e.g., finite element, finite difference).

Generally, the input file 708 is a persistent unit of stored data that can be retrieved, edited, applied, etc., to keep a record of the analysis and recreate or change analysis based on new assumptions or input conditions. The predictive analysis model 702 includes a file interface 710 that facilitates reading the file 708 in order to perform an analysis. The predictive analysis model 702 may receive inputs from elsewhere (e.g., a user interface), however most modeling software may at least allow saving and retrieving input data in a file format for later use. The file interface 710 may use conventions known in the art, such as utilizing file system hierarchies and access dialogs, allowing users to specify filenames and formats, version control, etc. The file interface 710 may also allow saving results 712 in a file format.

Generally, the predictive analysis model 702 may have a variety of ways to present results. As noted above, results file 712 may be used for short-term or long-term storage. The predictive analysis model 702 may also utilize a rendering interface 714 that facilitates providing results 716 in a format that may include 2D/3D graphics, tabular data, graphs, animations, etc. The different formatted results 716 may also be saved as a results file 712, e.g., as a document format, bitmap file, etc.

Figure 8:
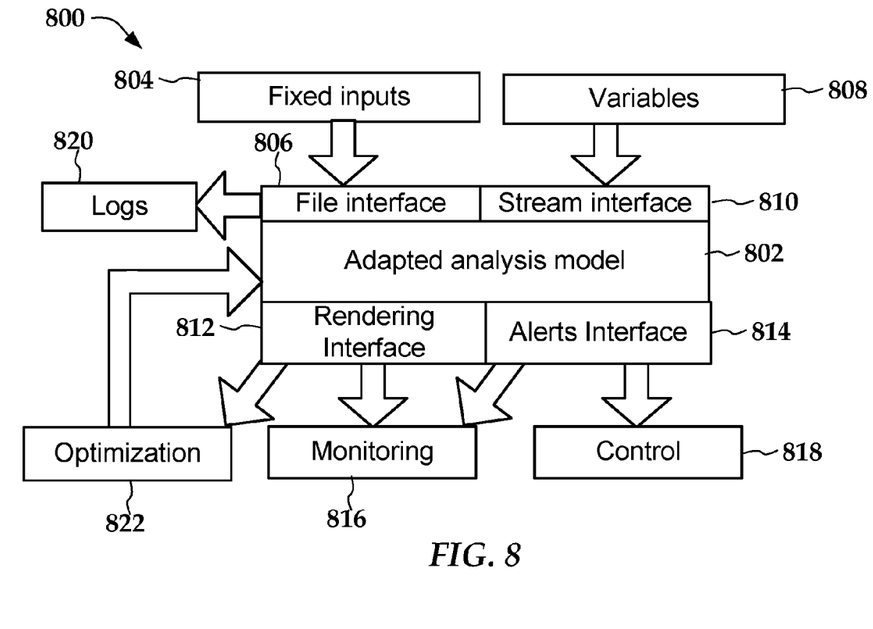

In FIG. 8, a management service 800 is integrated with an adapted analysis model 802 that may be largely based on the predictive analysis model 702 in FIG. 7. The adapted analysis model 802 may operate similarly with fixed inputs 804 that are stored and retrieved via a file interface 806. However, variable data 808 may vary independently and repeatedly based on system measurements, and so a streaming interface 810 may be used to manage variable data 808. The streaming interface 810 may use a network protocol or other remote data transfer means to obtain regular updates in the form of packets, messages, streams, etc.

Because the data obtained via the stream interface 810 changes repeatedly, the adapted analysis model 802 may need to be solved many more times than in predictive use cases. As such, the adapted analysis model 802 may be modified to solve the model more efficiently. Such modifications may include reducing mesh size/resolution, simplification of properties (e.g., remove or simplify temperature dependence in some heat transfer or fluid flow models), enable large-scale parallelization of the solution, reduction of input data points, etc.

The analysis model 802, stream interface 810 and/or sources of variable data 808 may provide a reduced amount of input data compared to inputs of the predictive analysis model. Among other things, this may help reduce network traffic and, improve solution time. The system may be configured to dynamically adjust the amount of data reduction. For example, if the data center appears to be operating at a desirable operating point, minimal amounts of data may be obtained via the sources (e.g., computing node components) of variable data 808. However, if system performance becomes abnormal, non-optimal, etc., the analysis model 202 may request more data from the computing nodes. The increased data may come from more nodes, be measured with finer granularity, include additional measured values, etc.

The results of the analysis from the analysis model 802 can be sent via one or both of a rendering interface 812 and an alerts interface 814 of the management service 800. The rendering interface 812 can be used to support a monitoring function 816, e.g., at a local or remote management console.

The monitoring 816 function may provide a wide variety of format presentations that are selected based on current need, operator familiarity, recent activity, etc. Generally, monitoring function 816 may be considered a regular activity that is undertaken whether or not the data center is currently experiencing problems. In contrast, the alerts interface 814 is intended to indicate conditions that may require attention.

The alerts interface 814 may send information to the monitoring function 816, e.g., to alert an operator of a condition needing attention. The alerts interface 814 may also communicate such information to a control function 818 that, either partially or fully automatically, causes a change to be made to the data center. Such change may include load balancing, control of cooling systems, taking devices offline, human or robotic replacement of components/LRUs, etc. While not shown, the control function 818 may also receive non-alert data, e.g., via rendering interface 812 or the like, to perform small adjustments to maintain a desired operating point. The control function 818 may also control type and interval of data collection activities as described in relation to FIG. 9. Both the rendering interface 812 and alerts interface 814 may send data to a log file 820 via file interface 806 to maintain a historical record of data center operation.

The output of the analysis model 802 may also be sent to an optimization module 822. In this example, the optimization module 822 receives data via the rendering interface 812, although the data could come from the alerts interface 814 or another interface. Generally, the optimization module 822 can provide a feedback signal that facilitates correcting or adjusting the analysis model 802. For example, if for a given amount of cooling air flow, certain measured temperatures are higher or lower than predicted, the optimization module 822 can cause the analysis model 802 to be adjusted accordingly. This adjustment may occur even if it does not result in anomalous operation (e.g., system adjusts, or does not cause out of specification operation). In this way, the model 802 can be further refined to operate more efficiently. The automated adjustments made to the adapted analysis model 802 can be used to assist in developing later analysis models, e.g., modify certain assumptions based on real-world performance.

In some data centers, measurement of environmental variables such as temperature is performed by dedicated measuring equipment. For example, wireless sensor nodes may be placed on or near equipment, and these nodes feed measured data to a monitoring system that collates and displays results. Other components already in use by the data center, such as the computing nodes, may utilize commonly available protocols such as Simple Network Management Protocol (SNMP) that allow for monitoring some aspects of machine performance via a network.

Protocols such as SNMP are often implemented at the host level, e.g., as a service or program running on the host operating system. As such, a monitoring system using SNMP can be implemented fairly inexpensively, only requiring additional software. However, there may be compatibility using SNMP. Many data centers use different operating systems on the same hardware, and/or may use a variety of hardware vendors to supply equivalent components. Software and hardware incompatibility can limit the effectiveness of a data-center-wide SNMP collection arrangement. There may also be security risks in running a protocol such as SNMP on the host operating systems. Further, such protocols may not work for host operating systems that experience a failure or slowdown, requiring a manual investigation of non-reporting nodes.

Figure 9:
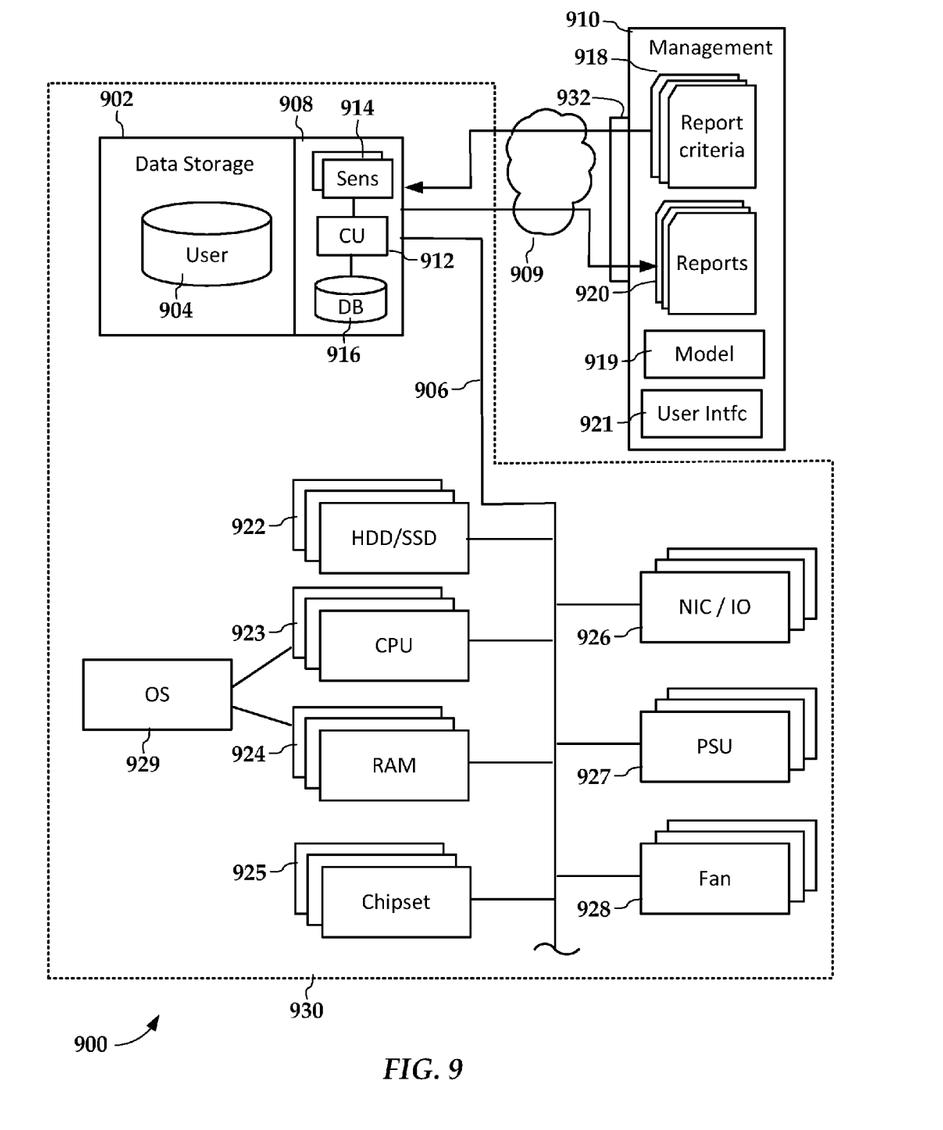
FIG. 9 is a block diagram of an apparatus according to an example embodiment.

As an alternative to dedicated sensors or host-resident reporting, data center embodiments may use existing components that have sensing and reporting capabilities integrated together with their primary functions. A reporting-capable component of a data center 900 according to an example embodiment is shown in FIG. 9. In this embodiment, the reporting capable component is a data storage device 902, which performs data storage functions associated with HDDs, solid-state drives (SSDs), and other persistent storage devices. It will be understood that reporting capabilities shown for the data storage device 902 may be implemented in any computer peripheral device, component, LRU, or the like.

The data storage device 902 includes a data store 904 for storing user data as a conventional storage device. Associated with the data store 902 are controllers and interfaces (not shown) that allow reading from and writing to the data store via a data bus 906. The data bus 906 may utilize multiple electrical and software protocols, such as data-storage-specific protocols (e.g., SATA, SCSI, SaS, Fibre channel) and general-purpose peripheral bus protocols (e.g., PCI, USB).

In addition to this conventional data storage functionality, the data storage device 902 includes a reporting module 908 that provides sensing, monitoring, and reporting functions usable with a system-wide management service, which also includes management console 910. A large number of similarly configured data storage devices 902 maybe distributed throughout the data center to perform monitoring, measuring, and reporting functions in addition to their primary data storage functions. These data storage devices 902 make operational measurements and send the measurements, either directly or via some other device, to the management console 910 via a network 909.

The reporting module 908 include a controller unit 912, which may include a special-purpose or general-purpose processor. The hard drive 902 may include a primary controller that provides both storage and reporting functions, or the controller unit 912 may be separate from and/or independent of the primary controller. The controller unit 912 is shown coupled to at least a sensor 914 and a database 916. The sensor 914 may include a plurality of sensors, some of which may be part of conventional drive functionality (e.g., temperature sensor) and/or others that are independently dedicated to the reporting module 908.

The database 916 is a region of persistent storage (e.g., part of data store 904) reserved for use with the reporting module 908. The database 916 may include instructions and/or configurations used by the controller unit 912 during operations. One example of data stored in the database 916 is operational measurements collected from sensors 914, as well as measurements collected from other devices. This database 916 can be used for queuing/buffering data prior to sending out to the management console 910, and/or for maintaining a historical record of operational measurements.

Another example of data that may be stored in the local database 916 includes report criteria 918 received from the management console 910. The report criteria 918 may include electronic messages sent to some or all of the reporting capable devices such as data storage device 902. The report criteria 918 may include, among other things, types of operational measurements to collect, formats of reported data, and time intervals of reporting, identification of reporting devices, etc. The report criteria 918 are sent (either direct or via broadcast) to reporting-capable devices via network 909, and can be stored in local databases such as database 916.

The operational measurements measured and collected by the data storage device 902 are sent out to the management console 910 via network 909 as reports 920. The reports 920 can be used for real-time or near-real-time monitoring of system status. Individual sensor readings can be extrapolated as described above to derive performance of larger components/assemblies in which the sensing devices are located. The content and format of the reports 920 can be designed for easy extensibility (e.g., extensible markup language—XML) and/or for compact size (e.g., compressed binary data).

The reporting module 908 need not be limited to reporting data for data storage device 902 in which it is located. The reporting module 908 may be able to locally gather sensor and/or performance data from other devices via data bus 906. These other devices may include other storage devices 922, processors 923, memory modules 924, chipsets 925, network cards or other I/O devices 926, power supplies 927, fans 928, and any other device known in the art. These devices 902, 922-928 may be collectively considered a computing node 930. For example, access to the devices 902, 922-928 may be governed by one or more operating systems 929 operating on processors 923 and stored in memory 924. The data center 900 may comprise large numbers of such computing nodes 930.

The reporting module 908 may be configured to collect data from devices 902, 922-928 via software/firmware facilities of the computing node 930, such as the operating system 929, hypervisor (not shown), or firmware (not shown). For example, the reporting module 908 may make function calls via software/firmware to collect sensor data, either through standardized or customized programming interfaces. Such data may include sensed data (e.g., temperature, operating time, vibration, etc.) and/or workload/configuration data (e.g., percentage of resources utilized, input-output data rate, clock speeds, etc.). The reporting module 908 may also utilize other facilities of the computing node 930, such as using network cards 926 for communication with the management console 910 via network 909.

The reporting module 908 may alternatively or in addition be configured to collect data from devices 902, 922-928 independently of software/firmware facilities of the computing node 930. For example, the reporting module 908 may directly communicate with devices 922-928 via bus 906, which may be the same or different than communication busses used by the computing node 930 to communicate with the devices 922-928. This allows the reporting module 908 to continue to operate if software or firmware of the computing node 930 fails or slows down. The reporting module 908 may also have independent communication facilities for exchanging messages with the management console, such as a built in Ethernet or wireless networking chipsets.

The management console 910 may include one or more computing arrangements, e.g., each having at least a processor coupled to memory, the memory having instructions that govern the operation of the computing arrangement. The management console 910 also includes at least one network interface that facilitates communication with computing node 930 via network 909. The management console 910 may include other software and hardware known in the art, such as operating systems, drivers, firmware, peripheral busses, etc.

One of the functions performed by the processor of the management console 910 is represented by an adapted computer analysis model 919 (see, e.g., FIG. 8 for details) that receives the operational measurements and derives an operational state of the data center 900 in response. The computer analysis model 919 is a model that was used to predict performance of the data center 900, and may have been adapted to utilize the operational measurements of the data center during operation of the data center. The management console 910 may include a user interface 921 to report status to a user, and may include other features (e.g., control elements) as shown and described elsewhere herein related to centralized monitoring and control of a data center.

Figure 10:
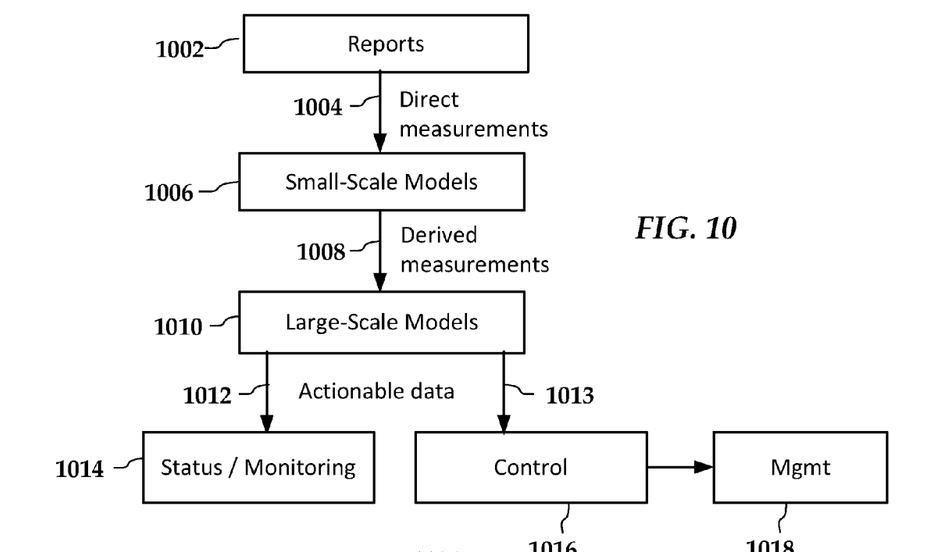
FIG. 10 is a block diagram illustrating utilization of reports according to example embodiments.

In reference now to FIG. 10, a block diagram illustrates how reports as described in FIG. 9 may be utilized by a management console, management service, or other computing arrangements according to example embodiments. Data collection devices such as data storage device 902 in FIG. 9 generate reports 1002 that describe at least part of a system state via direct measurements 1004. The direct measurements 1004 can be input to small-scale analysis models 1006 (e.g., analysis models as shown in FIG. 4) that can extrapolate the measured data to a performance estimate of a higher-level assembly. The small-scale analysis models 1006 provide derived measurements 1008 based on the direct measurements 1006.

The derived measurements 1008 can be input into even higher-level analysis models, here shown as large-scale analysis models 1010. Generally, the large-scale analysis models 1010 provide generalized actionable data 1012, 1013, which may include derived measurements, alerts, and anomalies. These data 1012, 1013 can be used by a status/monitoring module 1014 to provide summarized status of the data center. The status/monitoring module 1014 may, for example, provide visual and audible alerts to a human operation of anomalies or other serious conditions. The status/monitoring module 1014 may also display overall derived measurements, such as via a graphical representation as shown in FIG. 2.

A control module 1016 may also utilize the actionable data. For example, an automated system may be configured to detect anomalies and deal with the automatically, e.g., by load balancing computer resources, adjusting climate control parameters, signaling to computing nodes, etc. The data center may also be configured with robotics to automatically handle some situations, e.g., to remove and/or install components. These robotics may be assigned tasks based on determinations made by the control module 1016.

The control module 1016 may also utilize actionable data to provide inputs for other management and control software 1018. The other management software 1018 may already exist or be added after the models 1006, 1010 and associated components, and generally operates independently from them. This other management software 1018 may be configured to receive inputs from hardware such as external sensors and/or built-in sensors. In some cases, the hardware may not be used in the target system for reasons such as cost or availability. In other cases, the hardware may be used, but the other management software 1018 may not provide the desired performance based on direct measurements of the measuring hardware. This may involve utilizing an adaptation layer (not shown) that converts data output from the control module 1016 to formats and protocols expected of the management software 1018.

In cases where the measuring hardware is non-existent, the models 1006, 1010 may be configured to derive the input measurement data of the missing hardware, and provide them as input to the external software 1018. In this way, the management software 1018 can continue to be utilized without adding additional hardware to the data center. This can reduce expense of adding the new hardware and/or be used in cases where the required hardware is no longer available, unreliable, etc.

The control module 1016 may also or in the alternate act as a buffer for control measurements used by the other management software 1018. If the management software exhibits non-ideal behavior such as instability or not settling on optimal control points, the control module 1016 can adapt/adjust the inputs to alter this behavior based on predictions of the model 1006, 1010. In this way, models 1006, 1010 can be used as an intermediary control element that regulates measurement and feedback values to achieve an altered operational state (e.g., optimizing such parameters such as power consumption, load/wear distribution, response speed, etc.), yet does not require the models 1006, 1010 to include additional components that implement functionality that may already be provided by the management software 1018. Generally, the management software 1018, models 1006, 1010, and other components 1002, 1014, 1016 can be separately developed components that are combined together to form an integrated management service.

Figure 11:
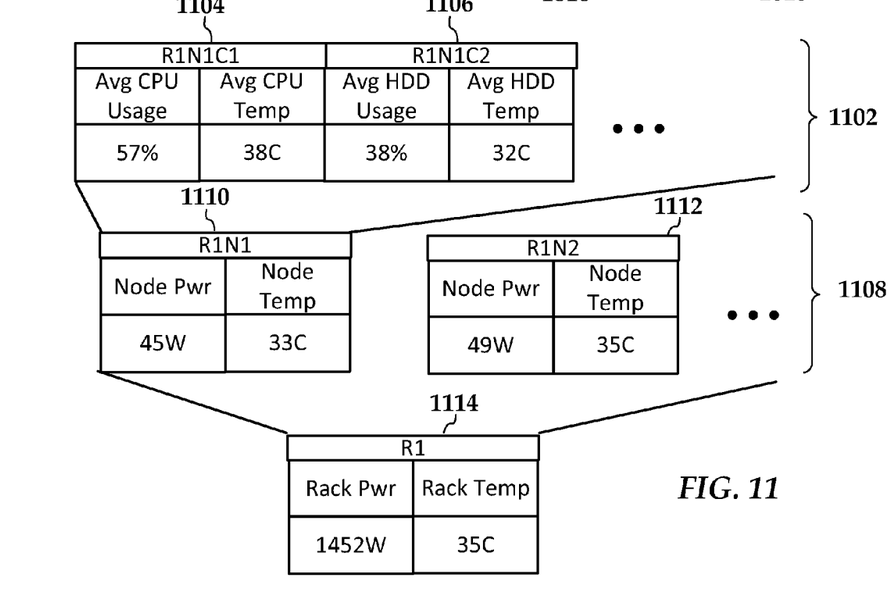
FIG. 11 is a block diagram illustrating consolidation of direct measurements into derived measurements according to an example embodiment.

In reference now to FIG. 11, a block diagram illustrates an example of how direct measurement data may be consolidated into derived measurements according to an example embodiment. Data set 1102 represents component-level measurements made by reporting-capable devices. For example, device 1104 represents a CPU reporting device that measures CPU temperature and usage. Device 1106 represents an HDD reporting device that measures HDD temperature and usage (e.g., I/O data rate). The data may be collected by the devices 1104, 1106 themselves, and/or by another device that collects local measurements. The devices 1104, 1106, may be virtual, e.g., representing a collection of devices (e.g., multiple CPUs, a hard disk array) or portions of devices (e.g., separate cores of a CPU, separate partitions of a hard disk drive).

Each device 1104, 1106 is given a nomenclature that indicates its place in the data center hierarchy. For purposes of this example, the hierarchy includes rack, computing node, and component. So device 1104 is indicated as R1N1C1, which indicates rack 1, node 1, and component 1. The devices 1104, 1106, either actual or virtual, may also be given a component specific identifier that is tracked by the system. In such a case, if a component is moved to another place in the hierarchy, it will be reassigned a hierarchy reference, but its unique identity may be used for other analysis purposes, such as selecting and using an analysis model for the device, tracking life remaining, maintenance history, special configurations used, etc.

Data set 1108 represents a higher level "roll-up" of data from the component data set 1102 to represent individual computing nodes. For example, device 1110 is a computing node that includes component devices 1104, 1106. Data related to device 1110 includes power consumption and mean temperature of the device 1110. These data may be derived from the component data 1102 and/or utilize measured data. Data for another data node 1112 can be similarly measured/derived. The node data 1108 is then rolled up to derive data for rack 1114. The rack data may be rolled up to higher-level abstractions, e.g., room, building, etc.

Figure 12:
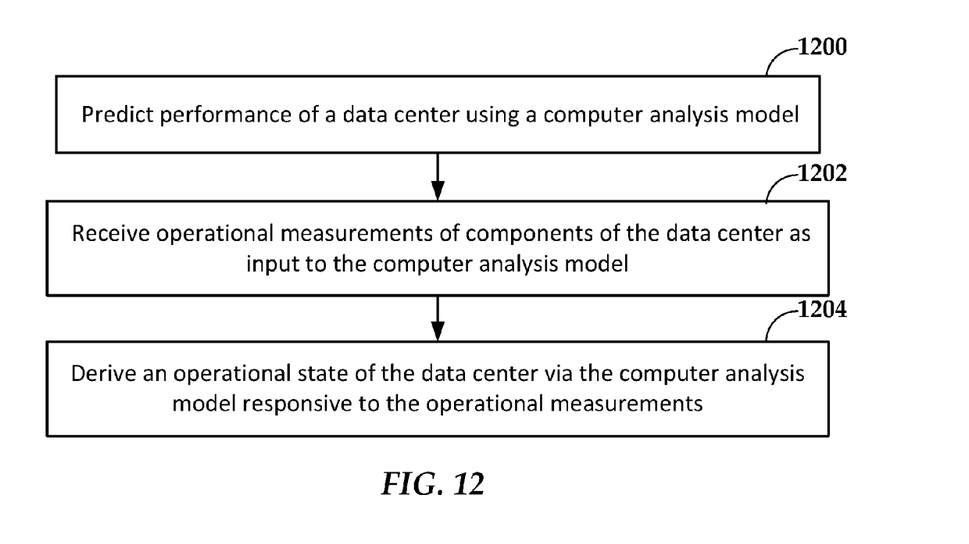
FIGS. 12 and 13 are flowcharts illustrating methods according to example embodiments.

In reference now to FIG. 12, a flowchart illustrates a method according to an example embodiment. The method involves predicting 1200 performance of a data center using a computer analysis model. Operational measurements of components of the data center are received 1202 as input to the computer analysis model. The computer analysis model may be adapted to utilize the operational measurements of the data center during operation of the data center. An operational state of the data center is derived 1204 via the computer analysis model responsive to the operational measurements.

Figure 13:
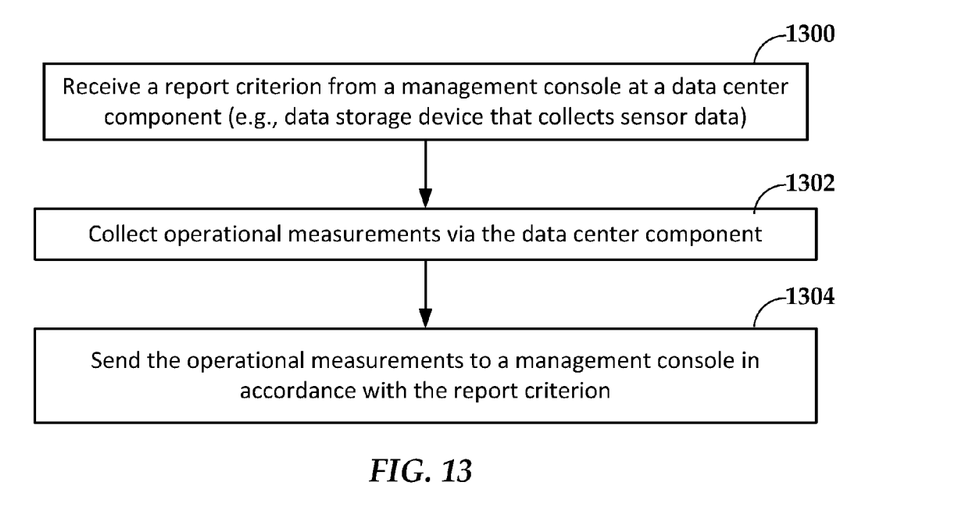

In reference now to FIG. 13, a flowchart illustrates a method according to another example embodiment. The method involves receiving 1300 a report criterion from a management console at a data center component that provides dual functions for the data center, such as a data storage device that collects sensor data. The report criterion specifies at least one of a time interval, data type, and format of operational measurements collected by the data center component. Operational measurements are collected 1302 via the data center component, and the operational measurements are sent 1304 to a management console in accordance with the report criterion.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to facilitate managing caching in data storage devices as described above.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. A method of monitoring a data center, comprising:
   forming a computer analysis model that predicts performance of the data center before the data center is operational;
   integrating the computer analysis model with a management service of the data center;
   receiving operational measurements from a plurality of data storage devices each coupled to a data bus within a respective one of a plurality of computing nodes of the data center, the data storage devices comprising a reporting module that collects the operational measurements from at least one other component of the respective computing nodes independently of software facilities of the respective computing nodes; and
   deriving an operational state of the data center via the computer analysis model responsive to the operational measurements.

2. The method of claim 1, wherein the operational measurements are received from operational components of the computing nodes, and wherein the operational state is derived by extrapolating from the operational measurements based on the computer analysis model to derive states of other operational components of the computing nodes.

3. The method of claim 1, further comprising sending a report criterion to the plurality of data storage devices, the report criterion specifying at least one of a time interval, data type, and format of the operational measurements.

4. The method of claim 1, further comprising adapting the computer analysis model to utilize the operational measurements of the data center during operation of the data center.

5. The method of claim 4, wherein adapting the computer analysis model comprises simplifying the computer analysis model to decrease processing time.

6. The method of claim 1, wherein the computer analysis model comprises a hierarchy of analysis models comprising smaller-scale models having outputs that are input to larger-scale models.

7. The method of claim 1, further comprising:
   obtaining a derived measurement value of one of the operational measurements via the computer analysis model using another of the operational measurements;
   comparing the derived measurement value with the other of the operational measurements; and
   detecting an operational anomaly based on the comparison.

8. The method of claim 7, further comprising making a change to the computer analysis model based on the operational anomaly.

9. The method of claim 1, further comprising providing inputs to a control module from the computer analysis model based on the operational state, wherein the inputs comprise at least one of:
   derived inputs for non-existent hardware that are derived based on the computer analysis model; and
   adapted inputs that modify operation of the control module to achieve an altered operational state.

10. A management console comprising:
    a network interface capable of being coupled to a plurality of computing nodes of a data center via a network of the data center; and
    a processor coupled to the network interface and being configured with instructions that cause the processor to:
       access a computer analysis model that was used to predicting performance of the data center;
       receive operational measurements from a plurality of data storage devices each coupled to a data bus within a respective one of a plurality of the computing nodes, the operational measurements used as input to the computer analysis model, the data storage devices comprising a reporting module that collects the operational measurements from at least one other component of the respective computing nodes independently of software facilities of the respective computing nodes;
       derive an operational state of the data center via the computer analysis model responsive to the operational measurements; and
       facilitate management of the data center based on the derived operational state.

11. The management console of claim 10, wherein the computer analysis model is adapted to utilize the operational measurements of the data center during operation of the data center, wherein adapting the computer analysis model comprises at least simplifying the computer analysis model to decrease processing time.

12. The management console of claim 10, wherein the computer analysis model comprises a hierarchy of analysis models comprising smaller-scale models having outputs that are input to larger-scale models.

13. The management console of claim 10, wherein the instructions further cause the processor to derive a value of other components of the computing nodes using the operational measurements and the computer analysis model.

14. The management console of claim 10 wherein the instructions further cause the processor to make a change to the computer analysis model based on an operational anomaly detected based on the operational measurements.

15. The management console of claim 10, wherein the instructions further cause the processor to send a report criterion to the plurality of data storage devices, the report criterion specifying at least one of a time interval, data type, and format of the operational measurements.

16. A system comprising:
an analysis computer comprising a first processor coupled to first memory configured via the first memory to prepare a computer analysis model that predicts performance of a data center before the data center is operational;
a plurality of data storage devices each coupled to a data bus within a respective one of a plurality of computing nodes of the data center, the data storage devices comprising a reporting module that collects operational measurements from at least one other component of the respective computing nodes independently of software facilities of the respective computing nodes; and
a management console comprising a second processor coupled to second memory and configured to:
receive the computer analysis model from the analysis computer;
receive, via a network of the data center, the operational measurements of the plurality of data storage devices;
input the operational measurements to the computer analysis model; and
derive an operational state of the data center via the computer analysis model responsive to the operational measurements.

17. The system of claim 16, wherein the management console is further configured to derive a value of other components of the computing nodes using the operational measurements and the computer analysis model.

18. The system of claim 16, wherein the management console is further configured to send a report criterion to the plurality of data storage devices, the report criterion specifying at least one of a time interval, data type, and format of the operational measurements.

* * * * *